United States Patent
Hentschel et al.

(12) 
(10) Patent No.: US 6,239,772 B1
(45) Date of Patent: May 29, 2001

(54) VIDEO MOIRE REDUCTION

(75) Inventors: Christaan Hentschel; Leendert Vriens, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/024,632

(22) Filed: Feb. 17, 1998

(51) Int. Cl.[7] .................................................... G09G 1/06
(52) U.S. Cl. ................................................ 345/10; 315/370
(58) Field of Search ................................. 345/10, 11, 12, 345/13; 348/806; 315/1, 370, 382

(56) References Cited

FOREIGN PATENT DOCUMENTS

| | | | |
|---|---|---|---|
| 0719042 | 6/1996 | (EP) | H04N/5/68 |
| 59-71024A | 4/1984 | (JP) | G02B/23/00 |
| WO9709820 | 3/1997 | (WO) | H04N/3/233 |

*Primary Examiner*—Regina Liang
(74) *Attorney, Agent, or Firm*—Steven R. Biren

(57) ABSTRACT

A display monitor operating under the raster scanning system repeats the line scanning of an electron beam by moving the resulting scanning lines in a direction substantially perpendicular to the line direction. In a cathode ray tube (CRT), the dot pitch of the fluorescent material on the display screen (DS) of the cathode ray tube (CRT) that can emit a fluorescence is determined by the aperture pitch of the shadow mask. Thus, in case of displaying a video pattern (f1h) in which consecutive pixels in a line repeat in an ON and OFF sequence an interference with the aperture pitch of the shadow mask may occur, thereby causing a moiré. The moiré phenomenon is reduced with a notch filter (NF) which has a passband for baseband video frequencies (f1h) and which has a notch in the amplitude characteristic at a spatial frequency a) at or near to a spatial frequency of dots (fdh or fhh) on the display screen (DS), or b) at or near to a predetermined spatial higher harmonic (f2h, f4h) of the baseband video (f1h) which is near to said spatial frequency of the dots (fdh or fhh).

8 Claims, 2 Drawing Sheets

VIDEO MOIRE REDUCTION

BACKGROUND OF THE INVENTION

The invention relates to a method of and a device for moiré reduction, and to an image display apparatus comprising a moiré reduction device.

A display monitor operating under the raster scanning system repeats the line scanning of an electron beam by moving the resulting scanning lines in a direction substantially perpendicular to the line direction. In a usual raster scan, the lines are scanned in the horizontal direction while the lines succeed each other in the vertical direction. In the so called transposed scan, the lines are scanned in the vertical direction and succeed each other in the horizontal direction. In a cathode ray tube, the dot pitch of the fluorescent material on the screen of the CRT that can emit a fluorescence is determined by the aperture pitch of the shadow mask. Thus, in case of displaying a video pattern in which consecutive pixels in a line repeat in an ON and OFF sequence an interference with the aperture pitch of the shadow mask may occur, thereby causing a moiré.

WO 97/09820 discloses a method of reducing the moiré phenomenon upon display of a video signal on a display device by low-pass filtering the video signal. The low-pass filter has a cut-off frequency substantially corresponding to a maximum frequency of a baseband portion of the video signal to obtain a low-pass filtered video signal to be applied to the display device. It is a drawback of the prior art that a complex and expensive low pass filter is required to suppress all the harmonics of the baseband signal to a high degree to reach an optimum moiré reduction, without attenuating the baseband signal to obtain an optimum sharpness of the displayed video.

OBJECTS AND SUMMARY OF THE INVENTION

It is an object of the invention to provide an improved video moiré reduction. To this end, a first aspect of the invention provides a method of reducing, a moiré phenomenon. A second aspect of the invention provides a device for reducing moiré. A third aspect of the invention provides an image display apparatus. Advantageous embodiments are defined in the dependent claims.

The prior art low pass filter has to be designed to pass the base band video without a substantial suppression to avoid to deteriorate the sharpness of the displayed picture. On the other hand, the prior art low pass filter has to suppress all higher harmonics of the baseband video signal to a high degree to avoid visible moiré disturbances.

The invention is based on the recognition that at a specific scan frequency belonging to a specific video mode (for example: VGA, SVGA, XGA), a specific spatial higher harmonic of a baseband video signal causes the or the majority of the video moiré. Therefore, according to the invention, it is sufficient to only suppress this specific higher harmonic to reduced the video moiré effectively. Thus, a notch filter with a first passband to pass the baseband video, and a notch or stopband at or near the specific higher harmonic reduces the video moiré to a very high degree. The behavior of this notch filter outside the first passband and the stopband is not relevant. It is thus not required to suppress all higher harmonics of the baseband video signal with a low pass filter.

The specific higher harmonic of the baseband video signal is that higher harmonic that is near to a spatial frequency of the mask-phosphor pattern of the display screen. According to an insight of the invention, in practice, the most relevant higher harmonic for moiré is caused by a baseband video signal comprising a sequence of pixels which are alternatively on and off. Such a sequence determines the highest video frequency to be displayed, preferably with full amplitude.

In an embodiment of the invention, the notch filter may have a further passband outside the above mentioned passband and stopband, the video harmonics in this passband will not contribute to moiré. Further, the notch is a zero (or at least a substantially zero) in the amplitude characteristic. Such a filter may be a simple comb filter.

In an embodiment of the invention, the notch frequency of the notch filter is controlled in response to the detected video mode displayed on the screen. A specific number of video pixels in a video line period is displayed on a line on the screen within a predetermined width, thereby determining the spatial frequencies of the higher harmonics of the video pixels. Thus, according to an insight of the invention, it is known in each video mode which spatial frequencies of the higher harmonics occur. Further, the spatial frequencies of the dots of the mask-phosphor pattern which are determined by the display device used are known. Consequently, it can be easily established which higher harmonic is nearest to one of the spatial frequencies of the dots. Only this higher harmonic, or the relevant dot frequency needs to be substantially suppressed to avoid moiré. In this way, the moiré is suppressed to a very high degree independent on the video mode displayed. In the prior art the amount of suppression of the moiré depends on which higher harmonic is responsible for the moiré. The nearer this higher harmonic is to the baseband, the less the suppression will be.

An embodiment of the invention, has the advantage that a very simple combfilter is able to substantially completely suppress the relevant higher harmonic, without substantially attenuating the baseband video.

An embodiment of the invention, a non-linear function succeeds the notch filter. The non-linear function compensates for the gamma of the picture display. In this way, the moiré is even suppressed better because no higher harmonics of the output video are regenerated by the non-linear characteristic of the picture display.

These and other aspects of the invention will be apparent from and elucidated with reference to the embodiments described hereinafter.

DESCRIPTION OF THE PREFERRED EMBODIMENTS

Figure 1:
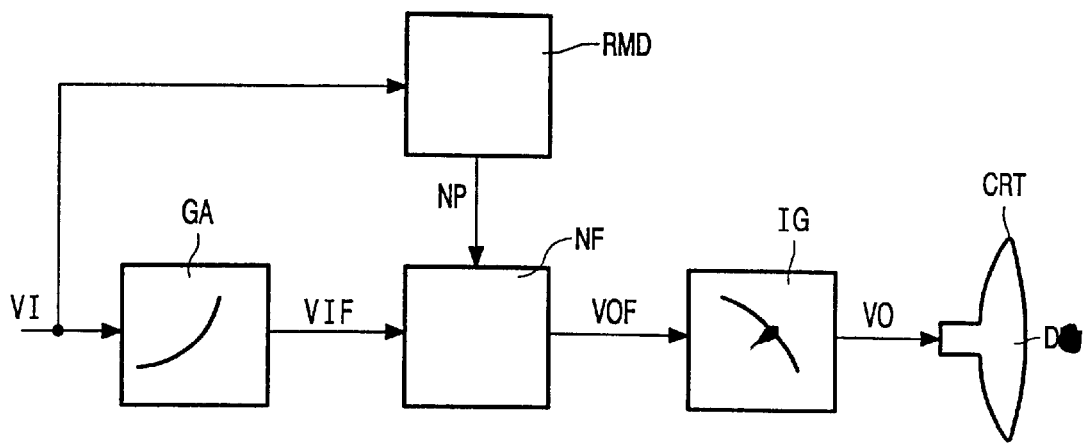
FIG. 1 shows a block diagram of a display apparatus comprising a device for reducing a moiré phenomenon according to the invention.

FIG. 1 shows a block diagram of a display apparatus comprising a device for reducing a moiré phenomenon according to the invention. The input video VI is supplied to a first correction circuit GA with a non-linear transfer characteristic for pre-processing the input video signal VI in accordance with a transfer function substantially corresponding to the inverse transfer function of a gamma pre-correction of the input video VI. The input video VI is pre-corrected for the gamma characteristic of the display device CRT, for example in case of broadcasted television signals. If a non pre-corrected input video VI is received, the first correction circuit GA is superfluous. The output video VIF of the first correction circuit GA is supplied to a notch filter NF. The notch frequency of the notch filter N° F. is controlled by a signal NP from a resolution detector RMD. The notch filter NF supplies a filtered video signal VOF to a second correction circuit IG which has a transfer function substantially corresponding to the inverse of the transfer function of the display device CRT. In this way, recreation of higher video harmonics due to a non-linear transfer characteristic of the gun in a cathode ray tube is avoided. The second correction circuit IG supplies an output video signal VO to the display device CRT. The second correction circuit IG is not essential for the invention, it merely serves for improving the moiré reduction. As the notch filter NF according to the invention suppresses the moiré better that the prior art low pass filter, the second correction circuit IG becomes less important.

The resolution detector RMD receives the input video VI to determine the video mode presented. This can be performed in several ways as known from multi-frequent computer monitors, for example by detecting the sign of synchronization signals supplied in or together with the input video VI, and by determining the line frequency of these synchronization signals.

The spatial frequencies of the relevant baseband video component f1h and its higher harmonics f2h, f3h, f4h can be calculated if the video mode and thus the number of pixels to be displayed in one line, and the width of a displayed line on the screen of the display device is known. For example, let us assume that on a 15" monitor cathode ray tube a line width is 265 mm. In the table below, the first column lists some video modes generated by computer video graphics cards, the second column lists the number of pixels in a line, the third column lists the distance sh between two pixels in a line, the fourth column lists the spatial frequency f1h of a baseband video signal consisting of a sequence of dots which are alternately on and off (this spatial frequency f1h=1/(2*sh) in the baseband is further referred to the first harmonic of the video), and the fifth column lists the spatial frequency f2h of the second harmonic (which is the first higher harmonic f2h=2/(2*sh)of the base band video) of the baseband spatial frequency f1h. The third harmonic f3h is 3/(2sh), and so on.

| MODE | PIXELS Per LINE | sh in mm | f1h in 1/mm | f2h in 1/mm |
|---|---|---|---|---|
| VGA | 640 | 0.414 | 1.12 | 2.41 |
| SVGA | 800 | 0.331 | 1.51 | 3.02 |
| XGA | 1024 | 0.259 | 1.93 | 3.86 |

The spatial baseband frequencies of the mask-phosphor pattern (further referred to as dot frequencies) can be calculated as is discussed with respect to FIG. 2. Thus, it is possible to determine for each video mode which higher harmonic f2h, f3h, f4h of the video signal VI is nearest to which dot frequency fdh, fhh. The moiré is effectively minimized by suppressing this nearest higher harmonic of the video signal VI. Therefore, the notch has to be selected at or near to this nearest higher harmonic of the video signal VI. It is also possible to select the notch frequency near to the relevant dot frequency fdh or fhh. This is especially interesting since the relevant dot frequency fdh, fhh is the same in all video modes. Now, the different higher harmonics f2h, f4h of the video signal VI in different video modes all are suppressed to a large amount, as they all are near to this dot frequency fdh or fhh.

The resolution detector RMD need not actually calculate the spatial frequencies, it is also possible to store the notch frequencies as required for the different video modes.

Figure 2A:
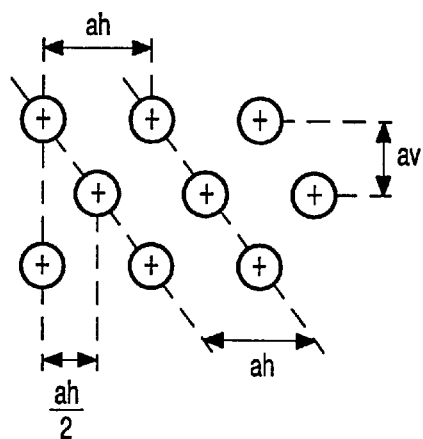
FIG. 2A shows a hexagonal mask.
Figure 2B:
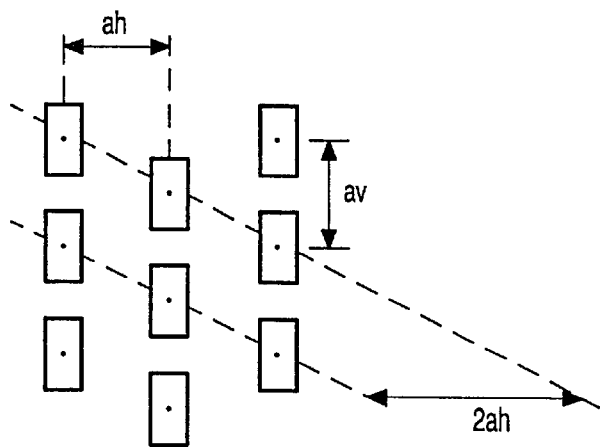
FIG. 2B shows a slotted mask to elucidate the spatial frequencies of the mask-phosphor pattern.

FIG. 2A shows a hexagonal mask and FIG. 2B shows a slotted mask to elucidate the spatial frequencies of the mask-phosphor pattern.

In FIG. 2A three rows of three dots each are shown of a cathode ray tube CRT with a hexagonal gun assembly. The dots may be the apertures of the shadow mask or phosphor areas on the screen DS. The dimensions are out of proportion for the sake of clarity. The distance between centers of two successive dots in a same row is ah, and the distance between two rows of dots is av. The base frequency of the mask-phosphor pattern in the horizontal direction fhh is the reciprocal of ah/2 which is the distance in horizontal direction between two successive dots in two successive lines, see the vertical dashed lines in FIG. 2A. The base frequency of the mask-phosphor pattern in the diagonal direction fdh is the reciprocal of ah which is the distance in horizontal direction between two successive slanted dashed lines in FIG. 2A.

In FIG. 2B, three columns of three dots each are shown of a cathode ray tube with an in-line gun assembly. The vertical distance between centers of two successive dots in a same column is av, and the horizontal distance between two columns of dots is ah. The base frequency of the mask-phosphor pattern in the horizontal direction fhl is the reciprocal of ah which is the distance in horizontal direction between two successive dots in two successive columns, see the vertical dashed lines in FIG. 2B. The base frequency of the mask-phosphor pattern in the diagonal direction fdl is the reciprocal of 2*ah which is the distance in horizontal direction between two successive slanted dashed lines in FIG. 2B.

Figure 3:
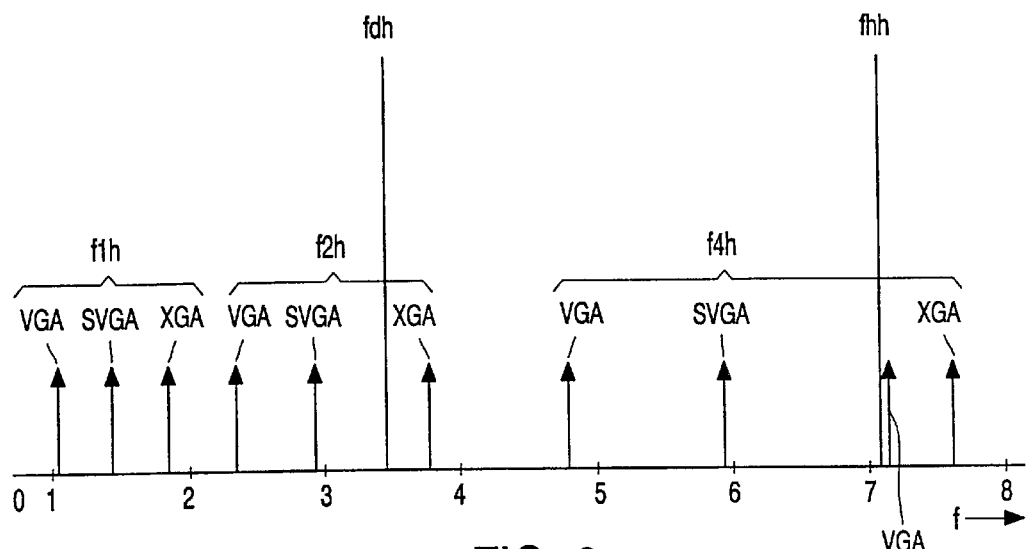
FIG. 3 shows a plot of the spatial frequencies of the mask-phosphor pattern, and relevant spatial baseband frequencies and higher harmonics of several video modes.

FIG. 3 shows a plot of the spatial frequencies fdh, fhh of the mask-phosphor pattern of a cathode ray tube CRT with a hexagonal gun assembly, and the relevant spatial baseband frequencies f1h and higher harmonics f2h, f4h of several video modes VGA, SVGA, XGA. The horizontal axis depicts the spatial frequency f in the line direction. The arrows show the first f1h, the second f2h, and the fourth harmonics f4h of the input video VI for VGA, SVGA, and XGA modes, respectively. A further arrow shows the sixth harmonic f6h of the filter input video VIF for the VGA mode. The third and fifth harmonics of the video VIF are not shown for sake of clarity. From left to right, the two long vertical lines indicate the base frequencies fdh, fhh of the mask-phosphor pattern in the diagonal direction and in the horizontal direction, respectively, based on a distance between centers of two successive dots in a same row of ah=0.28.

The frequency of the moiré phenomenon is low if the difference between the higher harmonic of the video frequency f2h, f4h, f6h and the dot frequency fdh, fhh is small. The moiré phenomenon becomes annoyingly visible if it has a low frequency.

As shown, for the VGA mode, the spatial frequency f6h of the sixth harmonic of the video VIF is very close to the spatial dot frequency in the horizontal direction fhh, while the distances between the spatial dot frequencies fdh, fhh and the other harmonics of the video f2h, f4h are quite large. Thus, the moiré is sufficiently suppressed if only this sixth harmonic f6h of the video VIF is sufficiently suppressed which a notch filter with a notch at or near to this sixth harmonic f6h.

As shown, for the XGA video mode, the spatial frequency of the second harmonic f2h of the video VIF is closest to the spatial dot frequency in the diagonal direction fdh. Thus, the moiré is sufficiently suppressed if only this second harmonic f2h is sufficiently suppressed by the notch filter. It is clear that a same reasoning applies to the moiré reduction in a cathode ray tube CRT with an in-line gun arrangement.

Figure 4:
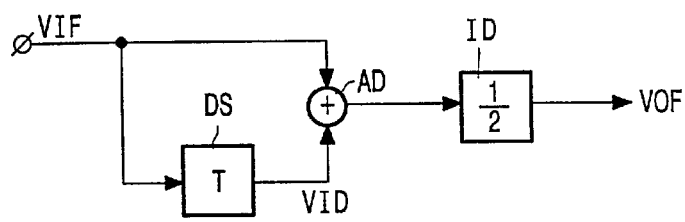
FIG. 4 shows a cosine filter according to an embodiment of the invention.

FIG. 4 shows a time discrete cosine filter according to an embodiment of the invention. A delay stage DS delays the filter input video VIF over a period T. An adder AD adds the video VIF to the delayed video VID, and a divider DI divides the addition by a factor two to supply the output video VOF.

Figure 5:
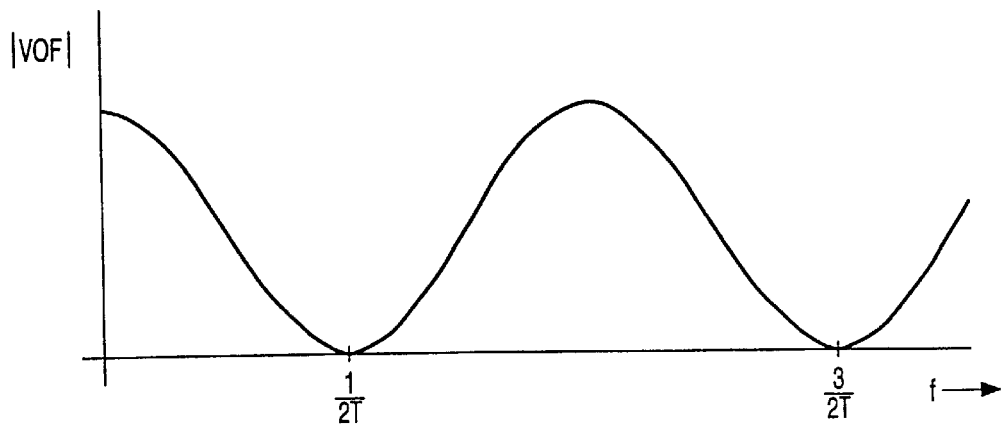
FIG. 5 shows the amplitude characteristic of the cosine filter of FIG. 4.

FIG. 5 shows the amplitude characteristic of the cosine filter of FIG. 4. As shown, the cosine filter is a comb filter with zero's (notches) in the amplitude characteristic at $$fz=(2*k+1)/(2*T) \text{ with } k=0, 1, 2, \ldots$$

The spatial frequency fz at which a notch is required can easily be adapted by controlling the delay period T.

In fact, the cosine filter averages every scan line with the same scan line delayed over the delay period T.

It should be noted that the above mentioned embodiments illustrate rather than limit the invention, and that those skilled in the art will be able to design many alternative embodiments without departing from the scope of the appended claims. Where transfer functions are said to be "corresponding" to other transfer functions, no exact identity is required. Thus, the non-linear transfer characteristic of the first correction circuit GA may be a quadratic function which can be realized in a simple way by multiplying the input signal with itself. The non-linear transfer characteristic of the second correction circuit IG may be a square root function.

All spatial dot frequencies depend on the construction of the cathode ray tube, the values shown are examples for a 15" Philips color monitor tube. All spatial frequencies of the harmonics of the video signal with an on-off sequence of pixels can easily be recalculated for other video modes and line widths.

It is possible to combine the notch filter which suppresses moiré in the line direction with a scan wobble in the vertical direction as known per se from EP-A-0719042.

In the claims, any reference signs placed between parenthesis shall not be construed as limiting the scope of the claims. The invention can be implemented by means of hardware comprising several distinct elements, and by means of a suitable programmed computer. The invention is advantageously applied in display apparatus with a cathode ray tube on which video signals have to be displayed with a different resolution in the line direction, such as multi-video-norm computer monitors or multi-norm TV sets.

What is claimed is:

1. A method of reducing a moiré phenomenon upon display of a video signal (VI) on a display device (CRT), comprising the step of filtering (NF) for obtaining a passband substantially corresponding to a baseband portion of said video (VI), characterized in that the step of filtering (NF) is adapted for obtaining a notch in an amplitude characteristic:

a) at or near to a spatial frequency of dots (fdh; fhh) on a display screen (DS) of the display device (CRT), or b) at or near to a spatial higher harmonic (f2h, f4h) of the baseband video (f1h), which spatial higher harmonic (f2h, f4h) is near to a spatial frequency of the dots (fdh; fhh) on the display screen (DS), and wherein the step of filtering further comprises controlling a notch frequency by a signal from a resolution detector.

2. A method as defined in claim 1, characterized in that the notch is a substantially zero, and in that the step of filtering (NF) is adapted for obtaining a further passband outside the first mentioned passband.

3. A method as defined in claim 1, characterized in that the method comprises the further steps of:

detecting (RMD) a resolution mode of said video signal (VI), and adapting the filtering (NF) such that a spatial frequency of the notch is controlled in dependence on the detected video mode (NP).

4. A device for reducing a moiré phenomenon upon display of an input video signal (VI) on a display device (CRT), comprising means for filtering (NF) to obtain a passband substantially corresponding to a baseband portion (f1h) of said input video (VI), characterized in that the means for filtering (NF) comprise a notch filter (NF) for obtaining a notch in its amplitude characteristic:

a) at or near to a spatial frequency of dots (fdh); fhh) on a display screen (DS) of the display device (CRT), or b) at or near to a spatial higher harmonic (f2h, f4h) of the baseband video (f1h) which is near to a spatial frequency of the dots (fdh; fhh), and wherein a notch frequency of the notch filter is controlled by a resolution detector.

5. A device as defined in claim 4, characterized in that said notch filter (NF) is a comb filter (NF).

6. A device as defined in claim 5, characterized in that the comb filter (NF) comprises:

a delay stage (DS) for delaying an input video (VI) over a period T=1/(2f) wherein f is the spatial frequency of the notch at which a zero in the amplitude characteristic is required, and an adder (AD) for adding the input video (VI) to the delayed video (VID) to supply output video (VOF) to the display device (CRT).

7. A device as defined in claim 6, characterized in that the device further comprises means (IG) for receiving the output video of the adder (AD) to perform a non-linear function on the output video to supply an adapted output video (VO) to the display device (CRT).

8. An image display apparatus comprising a device for reducing a moiré phenomenon upon display of an input video signal (VI) on a display device (CRT), the device for reducing the moiré phenomenon comprising means for filtering (NF) to obtain a passband substantially corresponding to a baseband portion (f1h) of said input video (VI), characterized in that the means for filtering (NF) comprise a notch filter (NF) for obtaining a notch in its amplitude characteristic:

a) at or near to a spatial frequency of dots (fdh; fhh) on a display screen (DS) of the display device (CRT), or c) at or near to a spatial higher harmonic (f2h; f4h) of the baseband video (f1h) which is near to a spatial frequency of the dots (fdh; fhh), and wherein the step of filtering further comprises controlling a notch frequency by a signal from a resolution detector.

* * * * *